(12) United States Patent
Tsai (10) Patent No.: US 11,372,512 B2
(45) Date of Patent: Jun. 28, 2022

(54) TOUCH PANEL, METHOD FOR MAKING SAME, AND TOUCH DISPLAY DEVICE

(71) Applicants: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

(72) Inventor: Han-Lung Tsai, Hsinchu (TW)

(73) Assignees: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

( * ) Notice: Subject to any disclaimer, the term of this patent is extended or adjusted under 35 U.S.C. 154(b) by 0 days.

(21) Appl. No.: 16/874,969

(22) Filed: May 15, 2020

(65) Prior Publication Data
US 2021/0247865 A1    Aug. 12, 2021

(30) Foreign Application Priority Data
Feb. 11, 2020    (CN) ......................... 202010086774.6

(51) Int. Cl.
*G06F 3/047*      (2006.01)
(52) U.S. Cl.
CPC .................... *G06F 3/047* (2013.01)

(58) Field of Classification Search
None
See application file for complete search history.

(56) References Cited

U.S. PATENT DOCUMENTS

| 2011/0094993 A1* | 4/2011 | Hamblin | G06F 3/04164 216/41 |
| 2014/0055405 A1* | 2/2014 | Ma | H05K 3/10 345/174 |
| 2016/0291776 A1* | 10/2016 | Li | G06F 3/04164 |
| 2017/0308201 A1* | 10/2017 | Xie | G06F 3/04164 |
| 2019/0384429 A1* | 12/2019 | Hsiao | B32B 15/02 |

* cited by examiner

*Primary Examiner* — Matthew Yeung
(74) *Attorney, Agent, or Firm* — ScienBiziP, P.C.

(57) ABSTRACT

A touch panel of improved appearance and function includes a substrate, first bridges, insulating strings, first electrodes, and second electrode strings. Each insulating string extends along a first direction and covers the first bridges. The insulating strings are spaced apart from each other in a second direction intersecting with the first direction. Adjacent first electrodes in the second direction are electrically connected to one first bridge to form a first electrode string. Each second electrode string is on one of the insulating strings. Each first electrode string and the adjacent second electrode string are insulated from each other by a difference in height along one insulating string. A method for making the touch panel and a touch display device using the touch panel are also disclosed.

7 Claims, 13 Drawing Sheets

TOUCH PANEL, METHOD FOR MAKING SAME, AND TOUCH DISPLAY DEVICE

FIELD

The subject matter herein generally relates to displays, specifically a touch panel, a method for making the touch panel, and a touch display device using the touch panel.

BACKGROUND

In a touch panel with a single-layer conductive layer structure, the touch driving electrodes and touch receiving electrodes are in one layer and insulated from each other. One of the touch driving electrodes and a touch sensing electrode bypasses the other by a bridge, thereby forming mutual capacitance at an intersection of the touch driving electrode and the touch receiving electrode.

In a manufacturing process, expansion and contraction of a substrate and accumulated errors caused by multiple exposures in a patterning process can cause misalignments when forming the bridge, which affects a gap between the electrodes and makes the bridge wider. In addition, a gap must be provided between the touch driving electrode and the adjacent touch sensing electrode for insulation, causing errors in function and visual problems in the touch sensing layer pattern.

Therefore, there is room for improvement in the art.

BRIEF DESCRIPTION OF THE DRAWINGS

Implementations of the present disclosure will now be described, by way of embodiment, with reference to the attached figures.

FIG. 10 is a cross-sectional view after completion of Block S2 of the method in

FIG. 7.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, string, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". The term "circuit" is defined as an integrated circuit (IC) with a plurality of electric elements, such as capacitors, resistors, amplifiers, and the like.

Figure 1:
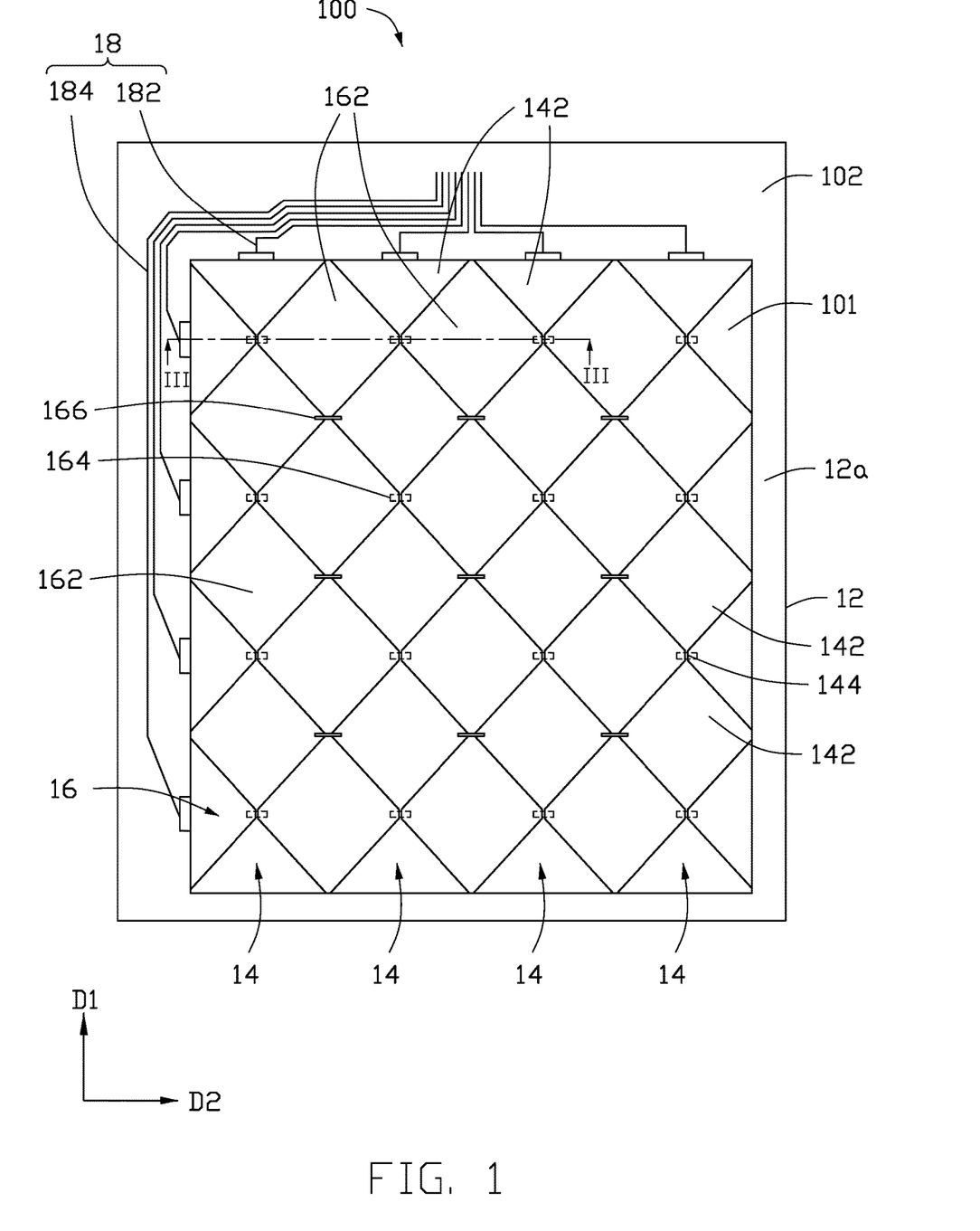
FIG. 1 is a plan view of a touch panel according to an embodiment.

FIG. 1 shows a touch panel 100 according to an embodiment. The touch panel 100 defines a touch area 101 for sensing user touches and a peripheral area 102 surrounding the touch area 101.

The touch panel 100 includes a substrate 12, a plurality of first bridges 164 spaced apart from each other on the substrate 12, a plurality of first electrodes 162 spaced apart from each other on the substrate 12, and a plurality of second electrode strings 14 spaced apart from each other on the substrate 12.

Each of the second electrode strings 14 extends along a first direction D1. Each of the second electrode strings 14 includes a plurality of second electrodes 142 and a plurality of second bridges 144. Each of the second bridges 144 electrically connects adjacent second electrodes 142. In a second direction D2, adjacent two first electrodes 162 are electrically connected to one of the first bridges 164 to form a first electrode string 16. In the first direction D1, the first electrode strings 16 are spaced apart from each other. Each of the first bridges 164 spans (or partially overlaps) one second bridge 144. In a thickness direction of the substrate 12, a projection of each first electrode 162 on the substrate 12 is between adjacent second electrode strings 14. The first direction D1 intersects with the second direction D2.

The first and second electrode strings 16 and 14 are in the touch area 101. In one embodiment, the first electrodes 162 are touch driving electrodes, and the second electrodes 142 are touch sensing electrodes. In another embodiment, the first electrodes 162 are touch sensing electrodes, and the second electrodes 142 are touch driving electrodes. The first electrodes 162 and the second electrodes 142 form a touch-sensing structure. When a conductive object (e.g., a finger) touches a certain point of the structure, a capacitive coupling between the first electrode 162 and the second electrode 142 changes. By processing and calculating the changes of this mutual capacitance, coordinates of the touch point can be determined.

Figure 2:
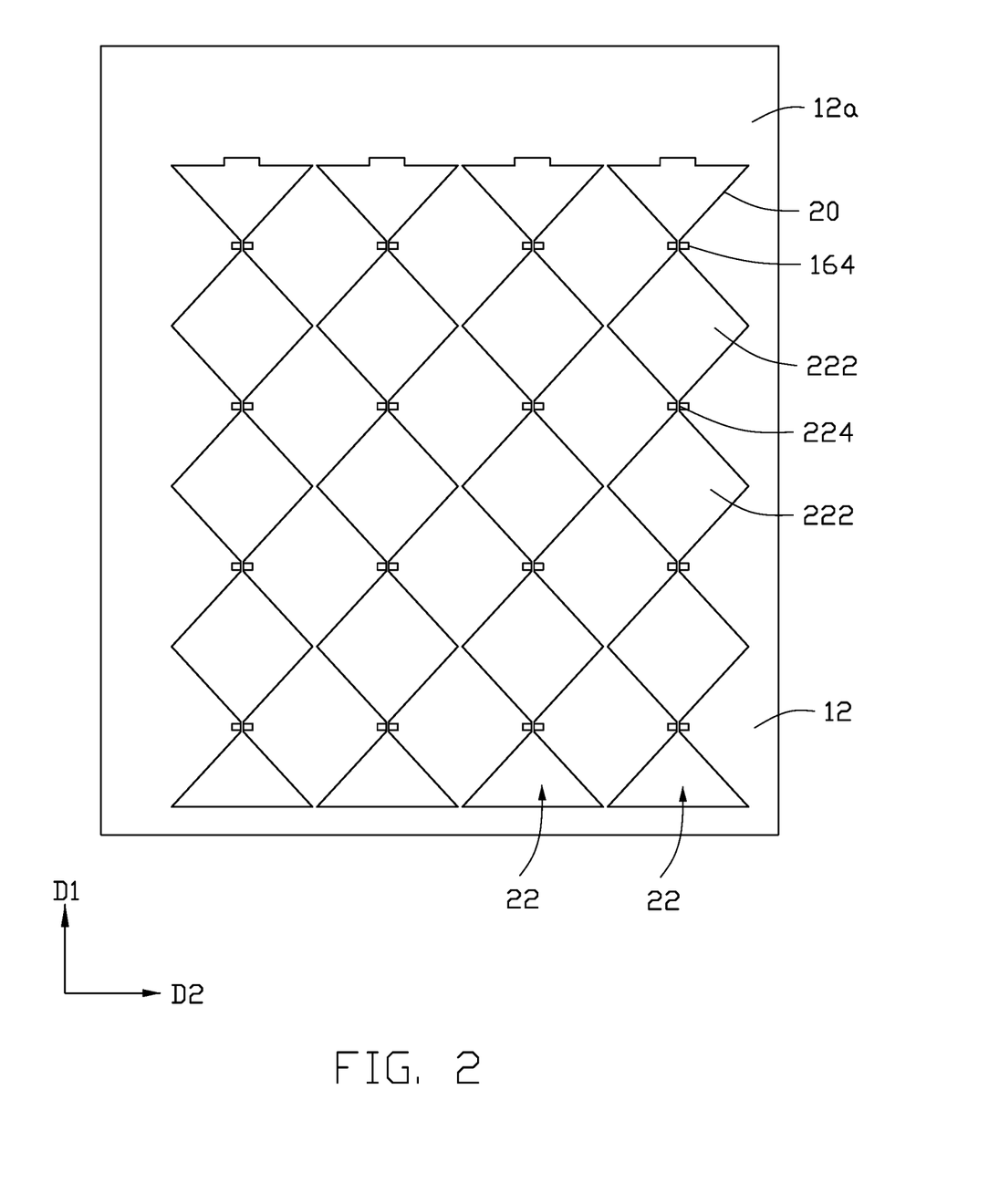
FIG. 2 is a schematic view showing a projection of a first bridge and a projection of an insulating string on a substrate of FIG. 1.

As shown in FIG. 1, the touch panel 100 further includes a plurality of traces 18 in the peripheral area 102. The traces 18 include a plurality of first traces 182 electrically connected to the first electrode strings 162 and a plurality of second traces 184 electrically connected to the second electrode strings 14. Each of the first traces 182 is electrically connected to one first electrode string 162, and each of the second traces 184 is electrically connected to one of the second electrode strings 14. The traces 18 may be made of conductive ink, conductive metal (e.g., silver), or the like. FIG. 2 shows projections of the first bridges 164 and the insulating strings 22 on the substrate 12.

As shown in FIG. 2, the touch panel 100 further includes a plurality of insulating strings 22 on the substrate 12. The insulating strings 22 are spaced apart from each other along the second direction D2. A pattern of the insulating strings 22 is the same as a pattern of the second electrode strings 14. Along the thickness direction of the substrate 12, a projection of each second electrode string 14 on the substrate 12 coincides with a projection of one insulating string 22. Each insulating string 22 extends along the first direction D1 to cover the plurality of first bridges 164. Each insulating string 22 includes a plurality of insulating blocks 222 and a plurality of insulation bridges 224. Each insulation bridge 224 connects adjacent insulating blocks 222. Each insulating string 22 is below one second electrode string 14. Each insulating block 222 corresponds to one second electrode 142, and each insulation bridge 224 corresponds to one second bridge 144.

In one embodiment, the insulating blocks 222, the first electrodes 162, and the second electrodes 142 are substantially diamond-shaped. The insulation bridges 224, the first bridges 164, and the second bridges 144 are substantially rectangular strips. The insulating blocks 222 and the insulation bridges 224 are formed by patterning one insulation layer. The first electrodes 162, the second electrodes 142, and the second bridges 144 are formed by patterning one conductive layer.

Figure 3:
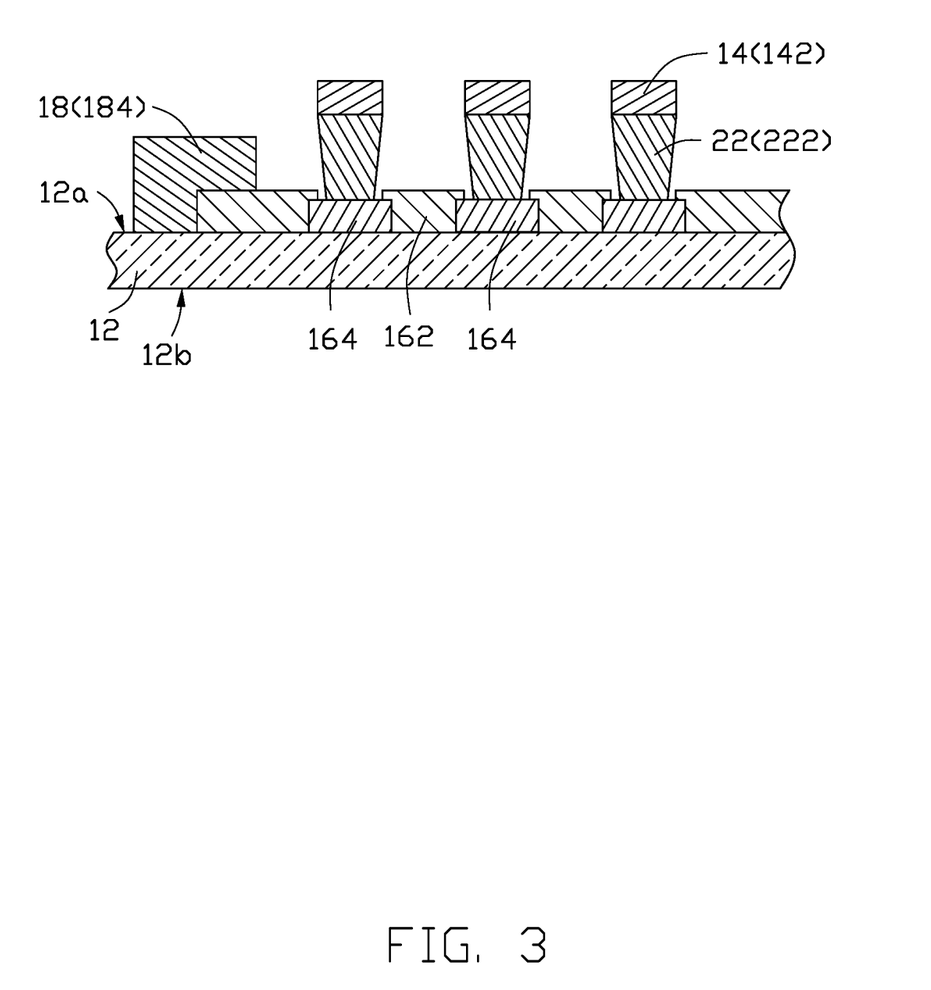
FIG. 3 is a cross-sectional view along line of FIG. 1.

FIG. 3 is a cross-sectional view along line of FIG. 1. As shown in FIG. 3, the substrate 12 has opposing first and second surfaces 12a and 12b. The first bridges 164 are spaced apart from each other on the first surface 12a. The first electrodes 162 are spaced apart from each other on the first surface 12a. Adjacent first electrodes 162 are electrically connected by one first bridge 164. Each of the second electrode strings 14 is on a surface of the insulating string 22 away from the substrate 12. Each first electrode string 16 and the second electrode string 14 adjacent thereto are insulated by a difference in height of the insulating strings 22.

Figure 4:
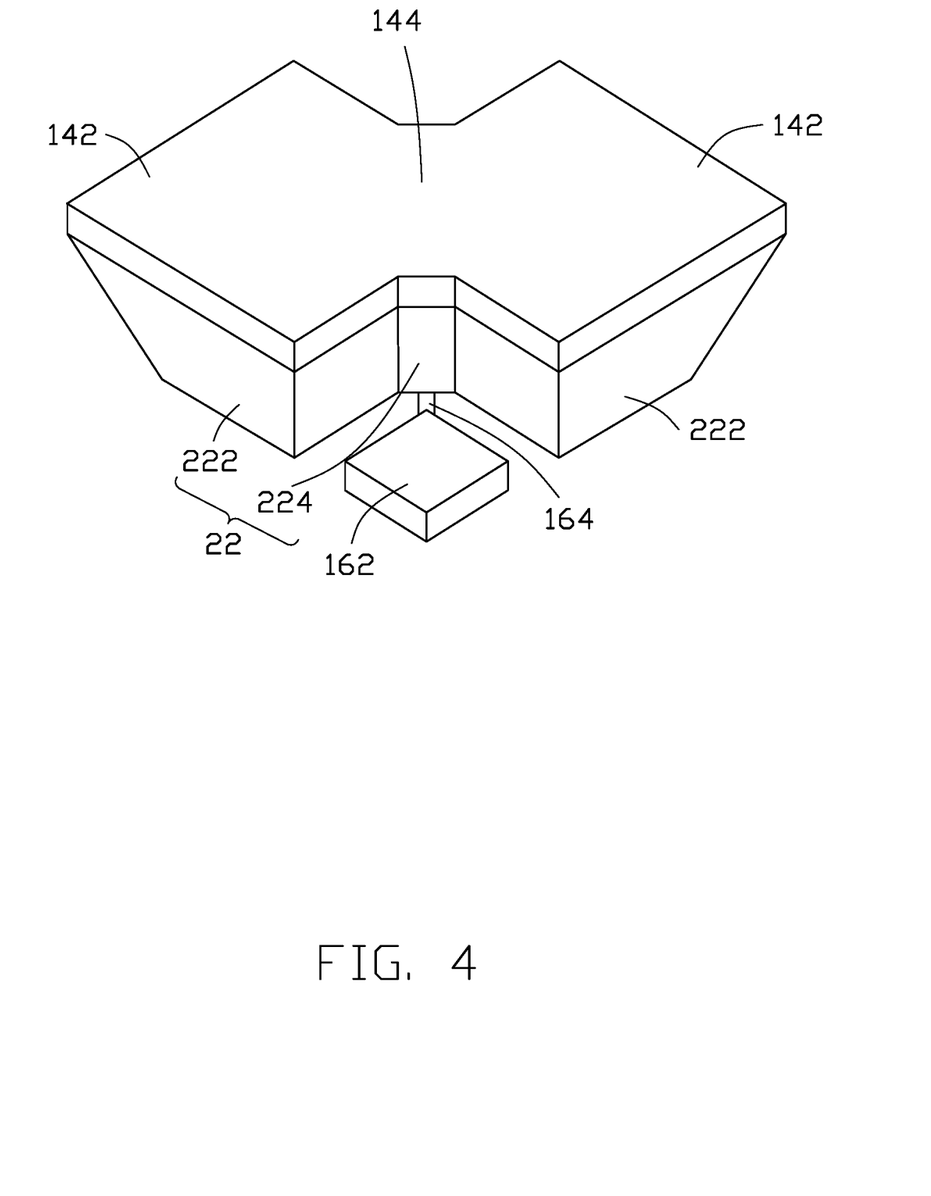
FIG. 4 is a side view of a first electrode string, a second electrode string, and an insulating string in the touch panel of FIG. 1.
Figure 5:
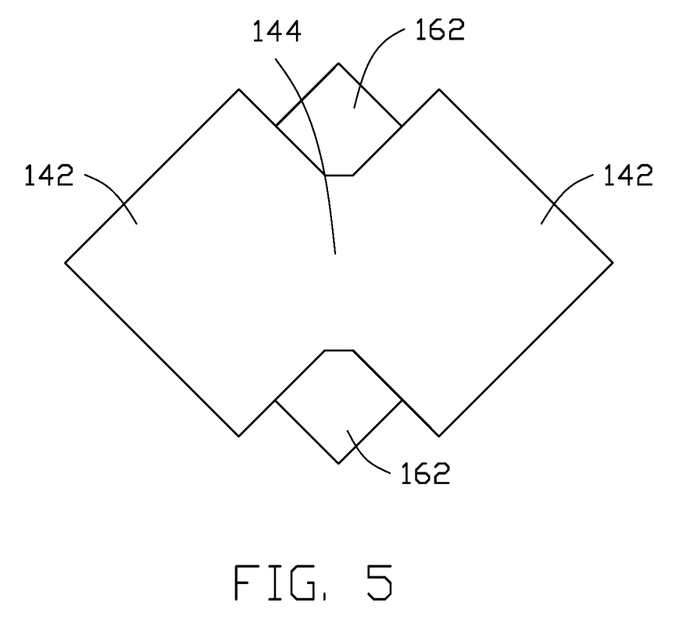
FIG. 5 is a top view of the first electrode string, the second electrode string, and the insulating string in FIG. 1.
Figure 6:
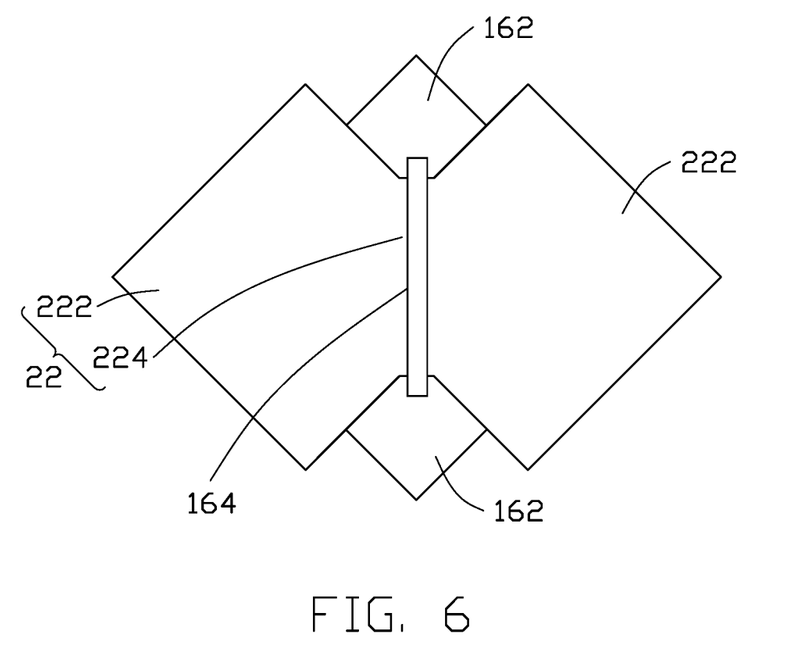
FIG. 6 is a bottom view of the first electrode string, the second electrode string, and the insulating string in FIG. 1.

As shown in FIG. 4 through FIG. 6, each first electrode 162 and the second electrodes 142 adjacent thereto are insulated by the difference in height of the insulating block 222. The first bridge 164 and the second bridge 144 are insulated by the insulation bridge 224.

As shown in FIG. 4, along a direction from the second electrode string 14 to the substrate 12, a size of a cross section of each insulating string 22 perpendicular to the thickness direction of the substrate 12 does not change or gradually decreases. Along the direction from the second electrode series 14 to the substrate 12, the side surfaces of the insulating block 222 and the insulation bridge 224 are rectangular or an inverted trapezoid. That is, the insulating strings 22 have such a height that the adjacent first electrodes 162 and the second electrode strings 14 are spaced apart. Compared with a method of forming bridges through multiple exposures, the insulating strings 22 have the same pattern as the second electrode strings 14, and the first electrode strings 16 and second electrode strings 14 are insulated by the difference in height of the insulating strings 22, thereby resolving and avoiding misalignments.

As shown in FIG. 1, in the first direction D1, there is a gap 166 between adjacent first electrodes 162, and a width of the gap 166 in the first direction D1 is not more than 10 microns. The first bridge 164 is generally a rectangular strip with a width of 30 microns and a length of 50 microns. That is, the width of the gap 166 between the first bridge 164 and the first electrode 162 is not visible to the eyes of a user.

In addition, since the first and second electrodes 162 and 142 are insulated by the height of the insulating strings 22, the spacing between the first and second electrodes 162 and 142 in a direction parallel to the first surface 12a is not required. The projections of the first electrode strings 16 and the second electrode strings 14 on the substrate 12 in a direction perpendicular to the thickness of the substrate 12 substantially cover the entire touch area 101, reducing chromatic aberration and with better visual effect.

In one embodiment, the first electrode strings 16 and the second electrode strings 14 are transparent, and may be made of indium tin oxide (ITO), conductive polymer (PEDOT), carbon nanotubes, nano silver wire, or nano copper wire.

In one embodiment, the substrate 12 may be a single base layer 122 or can include a base layer 122 and a protective layer 124 stacked together. The base layer 122 and the protective layer 124 may be made of polyimide (PI) and polyamide (PA), polycarbonate (PC), polyethersulfone (PES), polymethyl methacrylate (PMMA), polyethylene glycol terephthalate (PET), or cycloolefin copolymer (COC).

In one embodiment, the insulating strings 22 are shaped to have a steep taper (greater than 90 degrees), so that the first and second electrodes 162 and 142 have a difference in height perpendicular to the substrate 12, and there is no need to provide a spacing between the first and second electrodes 162 and 142. The visual aspect of the first and second electrodes 162 and 142 is improved. In addition, since the pattern of the insulating strings 22 is exactly the same as the pattern of the second electrode strings 14, the alignment between the overlapping of the first bridges 164 and the first electrodes 162 only needs to consider the alignment of the first bridges 164 and the insulating strings 22. A size of each first bridge 164 is minimized, which improves the aesthetics.

Figure 7:
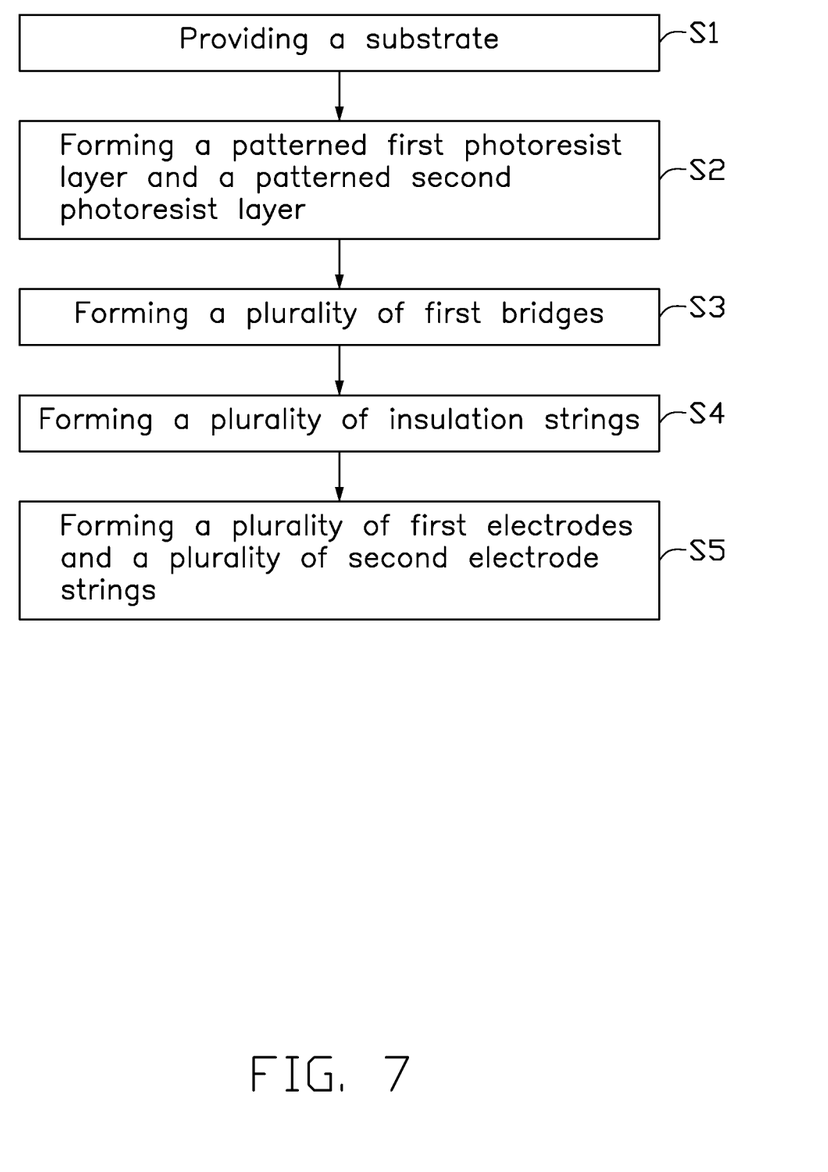
FIG. 7 is a flow chart of a method for making the touch panel shown in FIG. 1.

Referring to FIG. 7, a flowchart of as embodiment is disclosed. The method is provided by way of embodiment, as there are a variety of ways to carry out the method. The method described below can be carried out using the configurations illustrated in FIGS. 8 through 13 for example, and various elements of these figures are referenced in explaining the method. Each block shown in FIG. 7 represents one or more processes, methods, or subroutines, carried out in the method. Additionally, the illustrated order of blocks is by example only and the order of the blocks can change. The method can begin at Block S1.

Block S1: a substrate 12 is provided. A conductive layer 30 is on a surface of the substrate 12.

Figure 8:
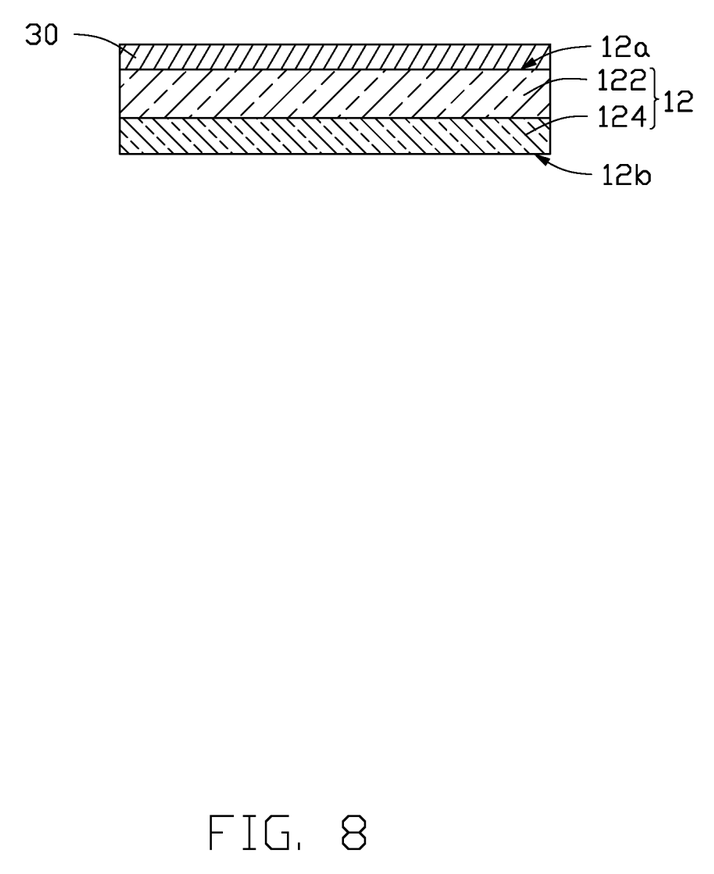
FIG. 8 is a cross-sectional view illustrating Block S1 of the method in FIG. 7.

As shown in FIG. 8, the substrate 12 includes a base layer 122 and a protective layer 124 on the base layer 122. The substrate 12 has opposing first and second surfaces 12a and 12b. The conductive layer 30 is formed on the first surface 12a by sputtering or chemical vapor deposition. In other embodiments, the substrate 12 may include a single base layer 122.

Block S2: a patterned first photoresist layer 90 is formed on the conductive layer 30, and a patterned second photoresist layer 80 is formed on a surface of the substrate 12 away from the conductive layer 30.

Figure 9:
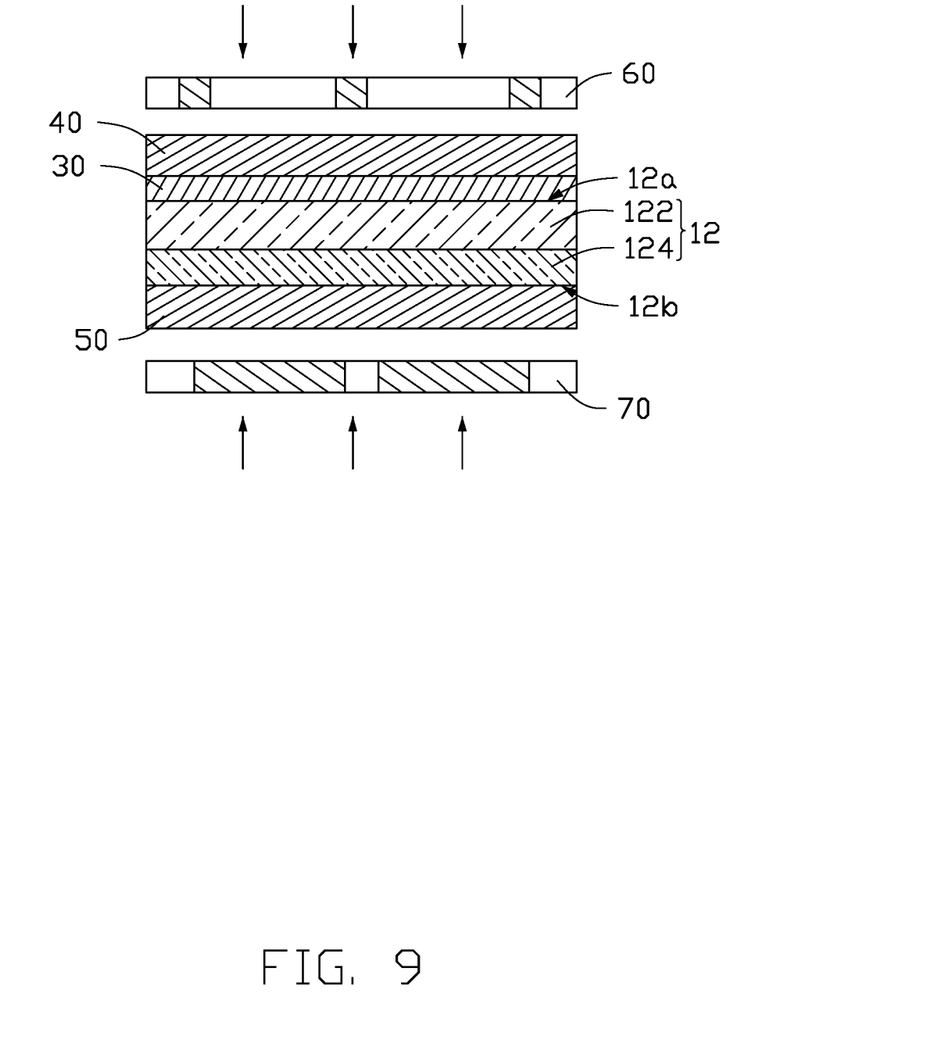
FIG. 9 is a cross-sectional view illustrating a step of patterning a first photoresist layer and a second photoresist layer in Block S2 of the method in FIG. 7.

As shown in FIG. 9, a first photoresist layer 40 is formed on the conductive layer 30, and a second photoresist layer 50 is formed and the second surface 12b. A first photomask 60 having a first predetermined pattern is used to expose and develop the first photoresist layer 40. A second photomask 70 having a second predetermined pattern is used to expose and develop the second photoresist layer 50.

Figure 10:
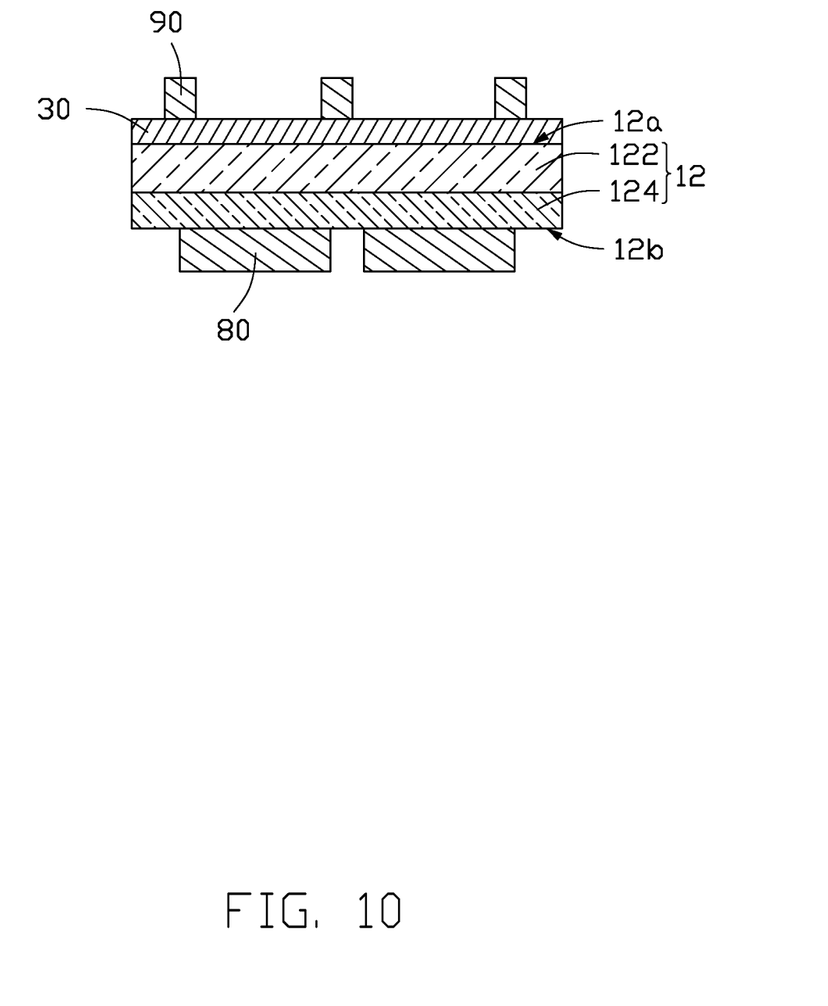

As shown in FIG. 10, the first photoresist layer 40 is patterned to form a patterned first photoresist layer 90. The second photoresist layer 50 is patterned to form a patterned second photoresist layer 80.

Block S3: the conductive layer 30 is patterned to form the first bridges 164 by using the patterned first photoresist layer 90 as a mask.

Figure 11:
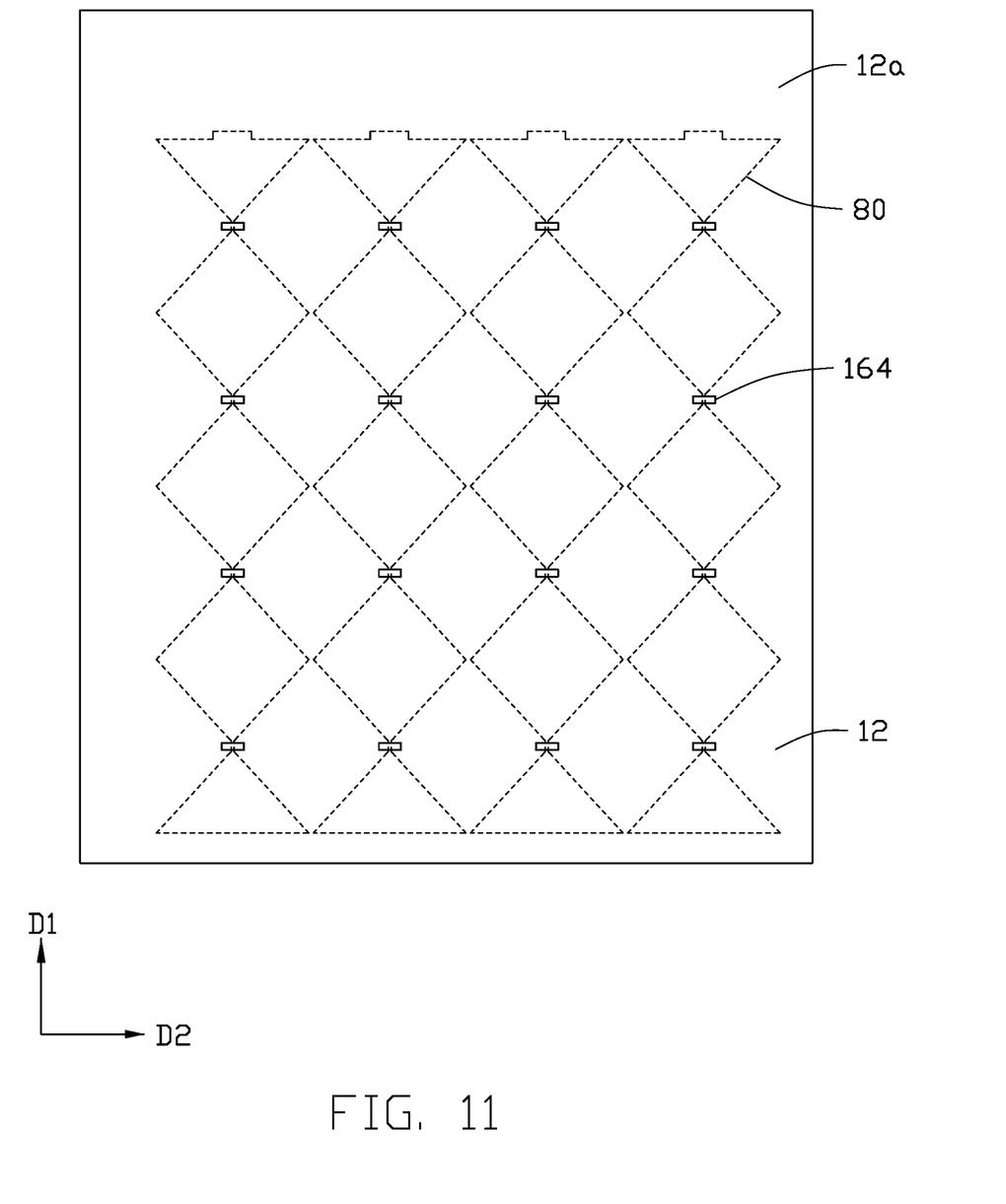
FIG. 11 is a schematic view illustrating Block S3 process of the method in FIG. 7.

As shown in FIG. 11, the first bridges 164 are spaced apart from each other on the first surface 12a of the substrate 12. The patterned second photoresist layer 80 is on the second surface 12b of the substrate 12.

Figure 12:
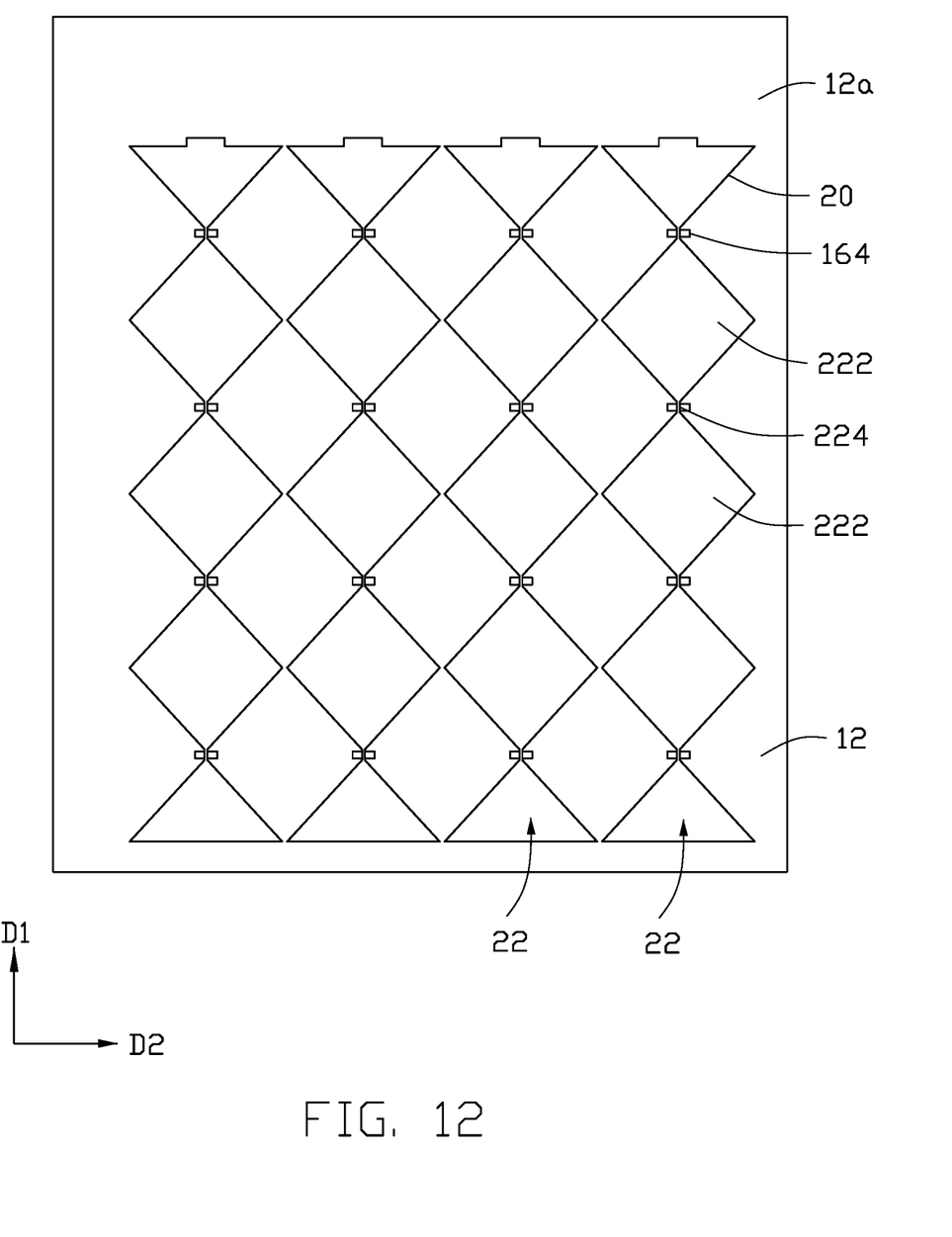
FIG. 12 is a schematic view illustrating Block S4 process of the method in FIG. 7.

Block S4: a plurality of insulating strings 22 are formed on the substrate 12 by using the patterned second photoresist layer 80 as a mask. As shown in FIG. 12, each of the insulating strings 22 extends along the first direction D1 to cover the first bridges 164. The insulating strings 22 are spaced apart from each other along the second direction D2.

Block S5: a plurality of first electrodes 162 and a plurality of second electrode strings 14 are formed on the substrate 12.

Figure 13:
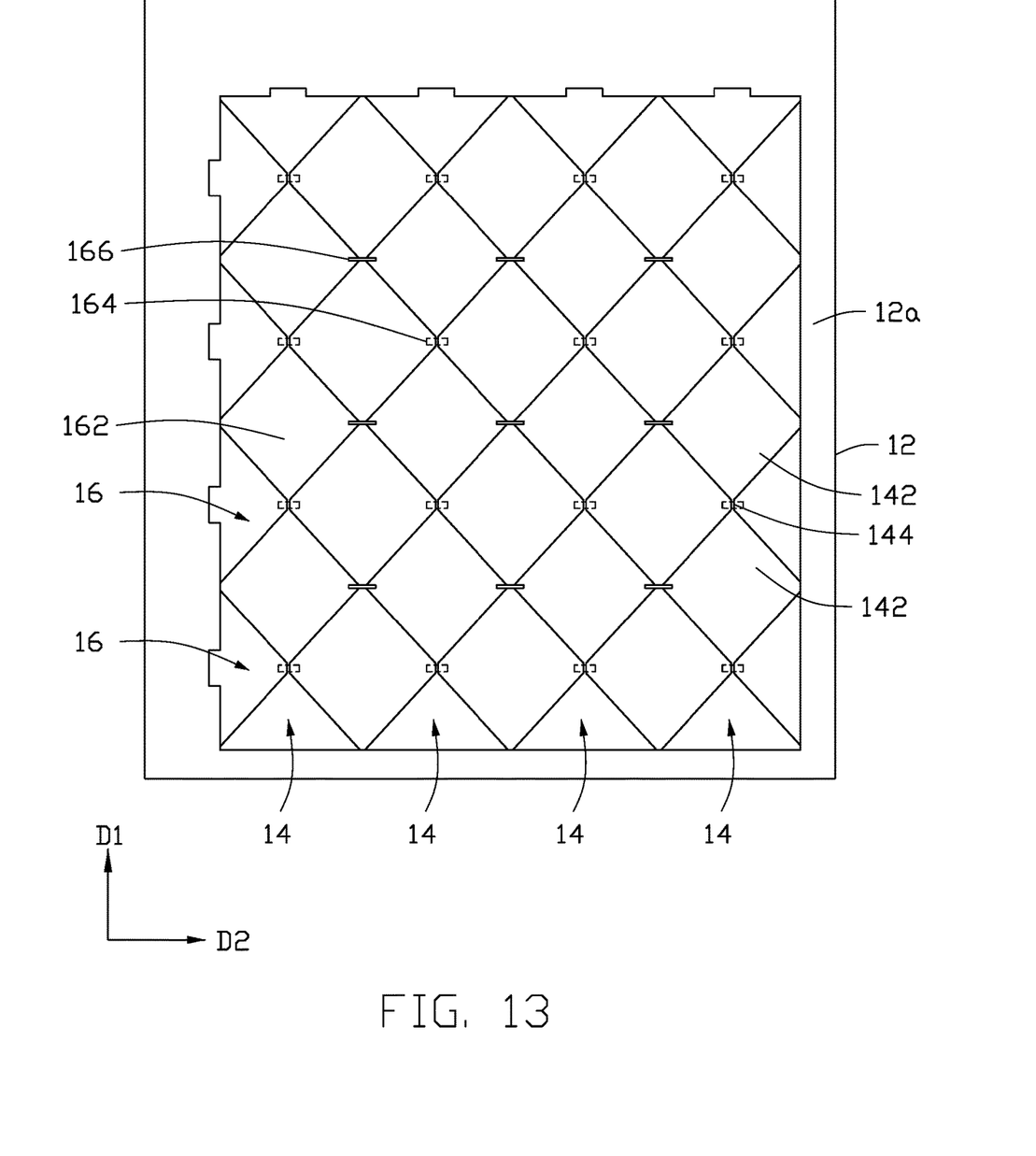
FIG. 13 is a schematic view illustrating Block S5 process of the method in FIG. 7.

As shown in FIG. 13, adjacent first electrodes 162 in the second direction D2 are electrically connected to one of the first bridges 164 to form a first electrode string 16. Each of the second electrode strings 14 is on a surface of the insulating string 22 away from the substrate 12.

As shown in FIGS. 3 to 6, each first electrode string 16 and the adjacent second electrode string 14 is insulated by the difference in height of the insulating string 22.

In one embodiment, Block S5 includes forming a transparent conductive layer (not shown) on a side of the substrate 12 on which the insulating strings 22 are formed and patterning the transparent conductive layer. A portion of the transparent conductive layer on the insulating strings 22 forms the second electrode strings 14, and the other portion of the transparent conductive layer is patterned to form the first electrodes 162. In the first direction D1, there is a gap 166 between adjacent first electrodes 162. In the second direction D2, adjacent first electrodes 162 are electrically connected by one first bridge 164 on the first surface 12a.

Since a pattern of the insulating strings 22 repeats the pattern of the first electrodes 162 and the second electrode strings 14, only the alignment of the first bridges 164 and the insulating strings 22 needs to be considered. In addition, the manufacturing processes of the first bridges 164 and the insulating strings 22 are a double-sided exposure, so that the size of each first bridge 164 can be minimized, to improve the appearance of the first bridges 164.

In one embodiment, the insulating string 22 is made of a material with a steeply tapering angle, so that the transparent conductive layer cannot climb. When the transparent conductive layer is formed on the insulating strings 22, the first electrodes 162 and the second electrodes 142 are patterned at the same time. In addition, there is a difference in height between the first electrodes 162 and the second electrodes 142, so that no spacing is required between the first electrodes 162 and the second electrodes 142. The appearance of the pattern of the first and second electrodes 162 and 142 is improved.

In one embodiment, the accuracy in overlapping between any two of the first bridges 164, the insulating strings 22, and the sensing layer (the first electrodes 162, the second electrode strings 14) is within 10 microns. In addition, as the size of the first bridge 164 is reduced, the electrical impedance of the first bridges 164 is reduced while improving the appearance, and the performance of the touch panel 100 is improved.

In one embodiment, both wet photoresist and dry photoresist are applicable in each patterning step.

In one embodiment, after Block S5, a plurality of first traces 182 and a plurality of second traces 184 are formed. The traces 18 can be formed by printing or printing combined with a laser process.

Figure 14:
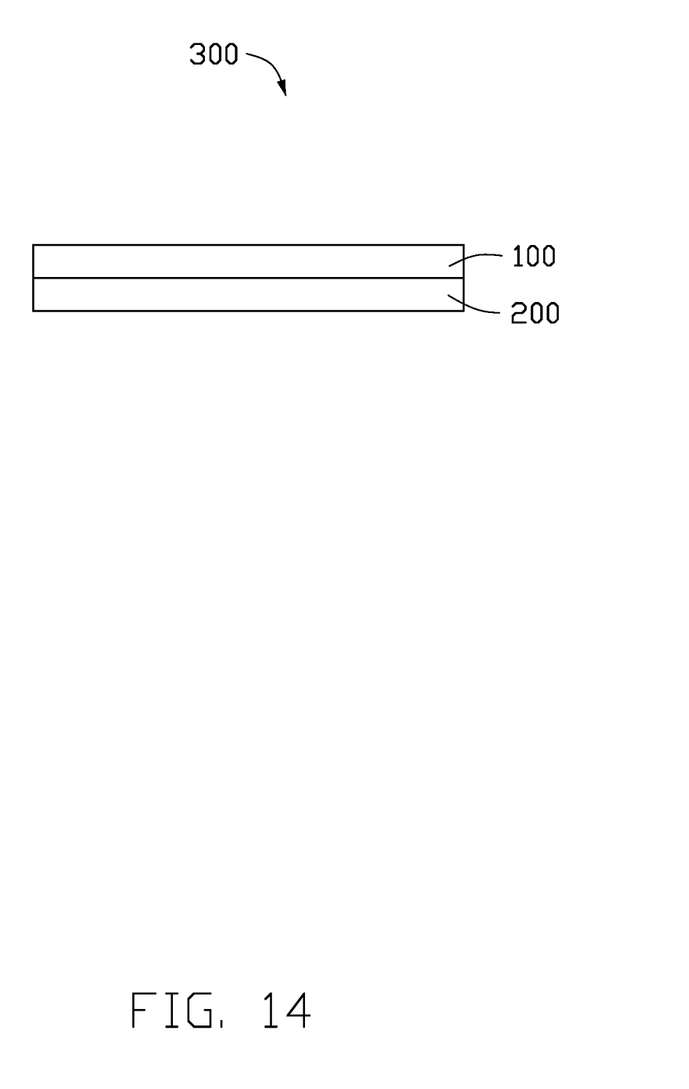
FIG. 14 is a schematic view of a touch display device according to an embodiment.

FIG. 14 shows a touch display device 300 according to an embodiment. As shown in FIG. 14, the touch display device 300 includes a display panel 200 and the touch panel 100 on a side of the display panel 200.

In one embodiment, the display panel 200 may be a liquid crystal display (LCD) panel, a micro light emitting diode (LED) display panel, or an organic light emitting diode (OLED) display panel. The touch display device 300 may be a smart phone, a tablet computer, or the like.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A method for making a touch panel, comprising:
providing a substrate, wherein a conductive layer is on a surface of the substrate;
forming a patterned first photoresist layer on the conductive layer and forming a patterned second photoresist layer on a surface of the substrate away from the conductive layer;
patterning the conductive layer by using the patterned first photoresist layer as a mask to form a plurality of first bridges spaced apart from each other;
forming a plurality of insulating strings on the substrate by using the patterned second photoresist layer as a mask, wherein the plurality of insulating strings and the patterned second photoresist layer are on opposite sides of the substrate, each of the plurality of insulating strings extends in a first direction and covers the plurality of first bridges, and the plurality of insulating strings are spaced apart from each other in a second direction intersecting with the first direction; and
forming a plurality of first electrodes and a plurality of second electrode strings on the substrate, wherein in the second direction each adjacent two of the plurality of first electrodes are electrically connected to one of the plurality of first bridges to form a first electrode string, each of the plurality of second electrode strings is on a surface of one of the plurality of insulating strings away from the substrate, each first electrode string and the plurality of second electrode strings adjacent thereto are insulated by a difference in height of one of the plurality the insulating strings.

2. The method for making the touch panel according to claim 1, wherein forming the plurality of first electrodes and the plurality of second electrode strings comprises:

forming a transparent conductive layer on a side of the substrate where the plurality of insulating strings is formed, and patterning the transparent conductive layer to form the plurality of first electrodes and the plurality of second electrode strings.

3. The method for making the touch panel according to claim 2, further comprising forming a plurality of first traces and a plurality of second traces, wherein each of the plurality of first traces is electrically connected to one of the plurality of first electrodes strings, each of the plurality of second traces is electrically connected to one of the plurality of second electrode strings.

4. The method for making the touch panel according to claim 1, wherein along a thickness direction of the substrate, a projection of each of the plurality of second electrode strings on the substrate coincides with a projection of one of the plurality of insulating strings.

5. The method for making the touch panel according to claim 4, wherein along a direction from the plurality of second electrode strings to the substrate, a size of a cross section of each of the plurality of insulating strings perpendicular to the thickness direction of the substrate does not change or gradually decreases.

6. The method for making the touch panel according to claim 4, wherein in the first direction, a gap is defined between any adjacent first electrodes of the plurality of first electrodes, and a width of the gap in the first direction is not greater than 10 microns.

7. The method for making the touch panel according to claim 4, wherein in the thickness direction of the substrate, a projection of each of the plurality of first electrodes on the substrate is between adjacent second electrode strings of the plurality of second electrode strings.

* * * * *